United States Patent
Wang

(10) Patent No.: US 12,231,623 B2
(45) Date of Patent: Feb. 18, 2025

(54) VIDEO ENCODING METHOD AND APPARATUS, VIDEO DECODING METHOD AND APPARATUS, COMPUTER-READABLE MEDIUM, AND ELECTRONIC DEVICE

(71) Applicant: Tencent Technology (Shenzhen) Company Limited, Guangdong (CN)

(72) Inventor: Liqiang Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 18/053,830

(22) Filed: Nov. 9, 2022

(65) Prior Publication Data
US 2023/0077935 A1   Mar. 16, 2023

Related U.S. Application Data

(63) Continuation of application No. PCT/CN2021/137001, filed on Dec. 10, 2021.

(30) Foreign Application Priority Data

Feb. 21, 2021   (CN) .......................... 202110194843.X

(51) Int. Cl.
  *H04N 19/105*  (2014.01)
  *H04N 19/11*   (2014.01)
  (Continued)

(52) U.S. Cl.
  CPC ........... *H04N 19/105* (2014.11); *H04N 19/11* (2014.11); *H04N 19/159* (2014.11); *H04N 19/176* (2014.11)

(58) Field of Classification Search
  CPC .... H04N 19/105; H04N 19/11; H04N 19/159; H04N 19/176
  See application file for complete search history.

(56) References Cited

U.S. PATENT DOCUMENTS

2017/0332084 A1* 11/2017 Seregin ................ H04N 9/8045
2018/0098064 A1*  4/2018 Seregin ................ H04N 19/159

FOREIGN PATENT DOCUMENTS

CN    104969552 A    10/2015
CN    109716774 A     5/2019
(Continued)

OTHER PUBLICATIONS

JVET-J0069; Van der Auwera et al.; Apr. 10-20, 2018; 4pgs (Year: 2018).*

(Continued)

*Primary Examiner* — Jonathan R Messmore
(74) *Attorney, Agent, or Firm* — Crowell & Moring LLP

(57) ABSTRACT

Provided are a video encoding method and apparatus, a video decoding method and apparatus, a computer-readable medium, and an electronic device, The video decoding method includes: decoding a coded block of a video image frame to obtain a target intra prediction mode corresponding to the coded block (510); in response to the target intra prediction mode belonging to a set of specified intra prediction modes, updating statistical values of the set of specified intra prediction modes, a number of the set of specified intra prediction modes being less than a total number of intra prediction modes (520); updating a most probable intra prediction mode list according to the updated statistical values of the set of specified intra prediction modes (530); and decoding another coded block of the video image frame based on the updated most probable intra prediction mode list (540). The technical solutions of the embodiments of this disclosure can reduce the hardware implementation cost while improving the encoding and decoding performance.

17 Claims, 5 Drawing Sheets

(51) Int. Cl.
*H04N 19/159* (2014.01)
*H04N 19/176* (2014.01)

(56) References Cited

FOREIGN PATENT DOCUMENTS

| | | |
|---|---|---|
| CN | 109792521 A | 5/2019 |
| CN | 110062227 A | 7/2019 |
| JP | 2013058939 A1 | 3/2013 |
| WO | WO 2020/251329 A1 | 12/2020 |

OTHER PUBLICATIONS

International Search Report and Written Opinion mailed Feb. 28, 2022 for International Application No. PCT/CN2021/137001 with English translation of International Search Report.

* cited by examiner

VIDEO ENCODING METHOD AND APPARATUS, VIDEO DECODING METHOD AND APPARATUS, COMPUTER-READABLE MEDIUM, AND ELECTRONIC DEVICE

RELATED APPLICATION

This application is a continuation application and claims the benefit of priority to PCT International Patent Application No. PCT/CN2021/137001, filed with the China National Intellectual Property Administration on Dec. 10, 2021, which is based on and claims the benefit of priority to Chinese Patent Application No. 202110194843.X, filed with the China National Intellectual Property Administration on Feb. 21, 2021, both entitled "VIDEO ENCODING METHOD AND APPARATUS, VIDEO DECODING METHOD AND APPARATUS, COMPUTER-READABLE MEDIUM, AND ELECTRONIC DEVICE." These prior patent applications are incorporated herein by reference in their entirety.

FIELD OF THE TECHNOLOGY

This application relates to the field of video encoding and decoding, and in particular, to a video encoding method and apparatus, a video decoding method and apparatus, a computer-readable medium, and an electronic device.

BACKGROUND OF THE DISCLOSURE

Frequency-based intra mode coding (FIMC) technology requires the establishment of a buffer with a length of IPD_CNT (representing a total number of intra prediction modes), and intra prediction modes corresponding to coded blocks in a decoded region are counted, so as to specify two intra prediction modes with highest frequencies as most probable intra prediction modes (most probable mode, MPM) corresponding to a coded block currently to be decoded.

However, on-chip storage is extremely expensive, and FIMC requires the use of a buffer with a length of IPD_CNT for counting all intra prediction modes, and the hardware implementation cost is relatively high.

SUMMARY

Embodiments of this disclosure provide a method, an apparatus, a computer-readable medium, and an electronic device for coding and decoding a video.

According to an aspect of the embodiments of this disclosure, a video decoding method is provided, including: decoding a coded block of a video image frame to obtain a target intra prediction mode corresponding to the coded block; in response to the target intra prediction mode belonging to specified intra prediction modes, updating respective statistical values of the specified intra prediction modes, a number of the specified intra prediction modes being less than a total number of intra prediction modes; updating a most probable intra prediction mode list according to the updated statistical values of the specified intra prediction modes; and decoding another coded block of the video image frame based on the updated most probable intra prediction mode list.

According to an aspect of the embodiments of this disclosure, a video coding method is provided, including: determining a target intra prediction mode corresponding to a coded block of a video image frame; in response to the target intra prediction mode being specified intra prediction modes, updating respective statistical values of the specified intra prediction modes, a number of the specified intra prediction modes being less than a total number of intra prediction modes; updating a most probable intra prediction mode list according to the updated statistical values of the specified intra prediction modes; and encoding another coded block of the video image frame based on the updated most probable intra prediction mode list.

According to an aspect of the embodiments of this disclosure, a video decoding apparatus is provided, including: a decoding unit, configured to decode a coded block of a video image frame to obtain a target intra prediction mode corresponding to the coded block; a first updating unit, configured to, in response to the target intra prediction mode belonging to specified intra prediction modes, update respective statistical values of the specified intra prediction modes, a number of the specified intra prediction modes being less than a total number of intra prediction modes; a second updating unit, configured to update a most probable intra prediction mode list according to the updated statistical values of the specified intra prediction modes; and a processing unit, configured to decode another coded block of the video image frame based on the updated most probable intra prediction mode list.

According to an aspect of the embodiments of this disclosure, a video coding apparatus is provided, including: a determining unit, configured to determine a target intra prediction mode corresponding to a coded block of a video image frame, the target intra prediction mode being an intra prediction mode adopted by the coded block; a third updating unit, configured to, in response to the target intra prediction mode belonging to specified intra prediction modes, update respective statistical values of the specified intra prediction modes, a number of the specified intra prediction modes being less than a total number of intra prediction modes; a fourth updating unit, configured to update a most probable intra prediction mode list according to the updated statistical values of the specified intra prediction modes; and an encoding unit, configured to encode another coded block of the video image frame based on the updated most probable intra prediction mode list.

According to an aspect of the embodiments of this disclosure, a computer-readable storage medium is provided, storing a computer program, the computer program, when executed by a processor, implementing the video decoding method according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the video decoding method according to the foregoing embodiments.

According to an aspect of an embodiment of this disclosure, a computer program product or a computer program is provided, including computer instructions, the computer instructions being stored in a computer-readable storage medium. A processor of a computer device reads the computer instructions from the computer-readable storage medium, and executes the computer instructions, to cause the computer device to implement the video decoding method provided in the various optional embodiments described above.

According to an aspect of the embodiments of this disclosure, a chip is provided, including a programmable logic circuit and/or program instructions, the chip being configured to implement the video encoding method or the video decoding method according to the foregoing embodiments when being run.

In some embodiments of this disclosure, by setting a number of specified intra prediction modes being less than a total number of intra prediction modes, in a case that a target intra prediction mode corresponding to a coded block belongs to the specified intra prediction modes, respective statistical values of the specified intra prediction modes are updated, and then, according to the updated statistical values of the specified intra prediction modes, a most probable intra prediction mode list is updated, so that an MPM list can be updated by simply performing statistics on some intra prediction modes, thereby reducing the hardware implementation cost and improving the encoding and decoding performance.

DESCRIPTION OF EMBODIMENTS

Figure 1:
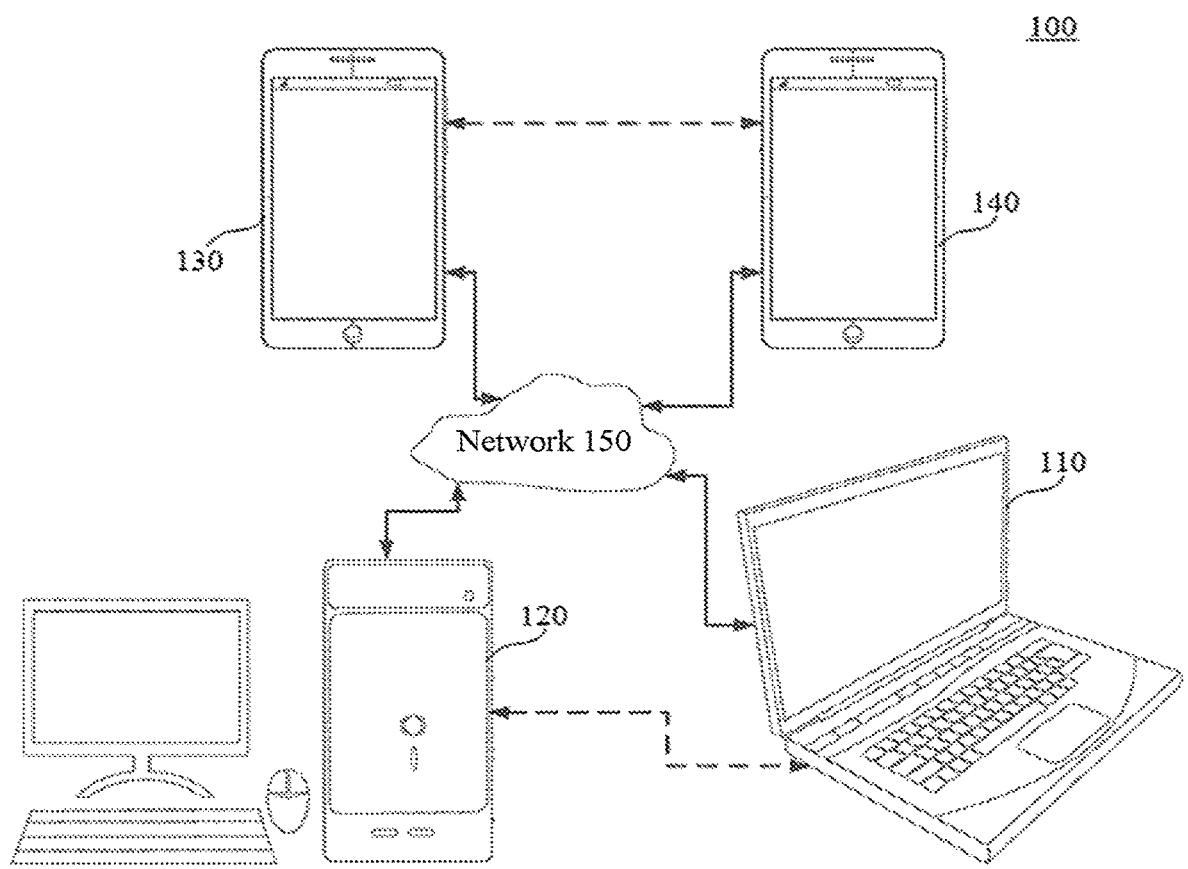
FIG. 1 is a schematic diagram of an exemplary system architecture to which a technical solution in an embodiment of this disclosure is applicable.

FIG. 1 is a schematic diagram of an exemplary system architecture to which a technical solution in an embodiment of this disclosure is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bit streams. The second terminal apparatus 120 may receive the coded video data through the network 150, decode the coded video data to recover the video data, and display a video image according to the recovered video data.

In an embodiment of this disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video image on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in this disclosure may not be limited thereto. The embodiments disclosed in this disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, e.g., including a wired and/or wireless communication network. The communication network 150 may exchange data in a circuit switching channel and/or a packet switching channel. The network may include a telecommunication network, a local area network, a wide area network, and/or the Internet. For the purpose of this disclosure, unless explained below, an architecture and a topology of the network 150 may be inessential to the operation disclosed in this disclosure.

Figure 2:
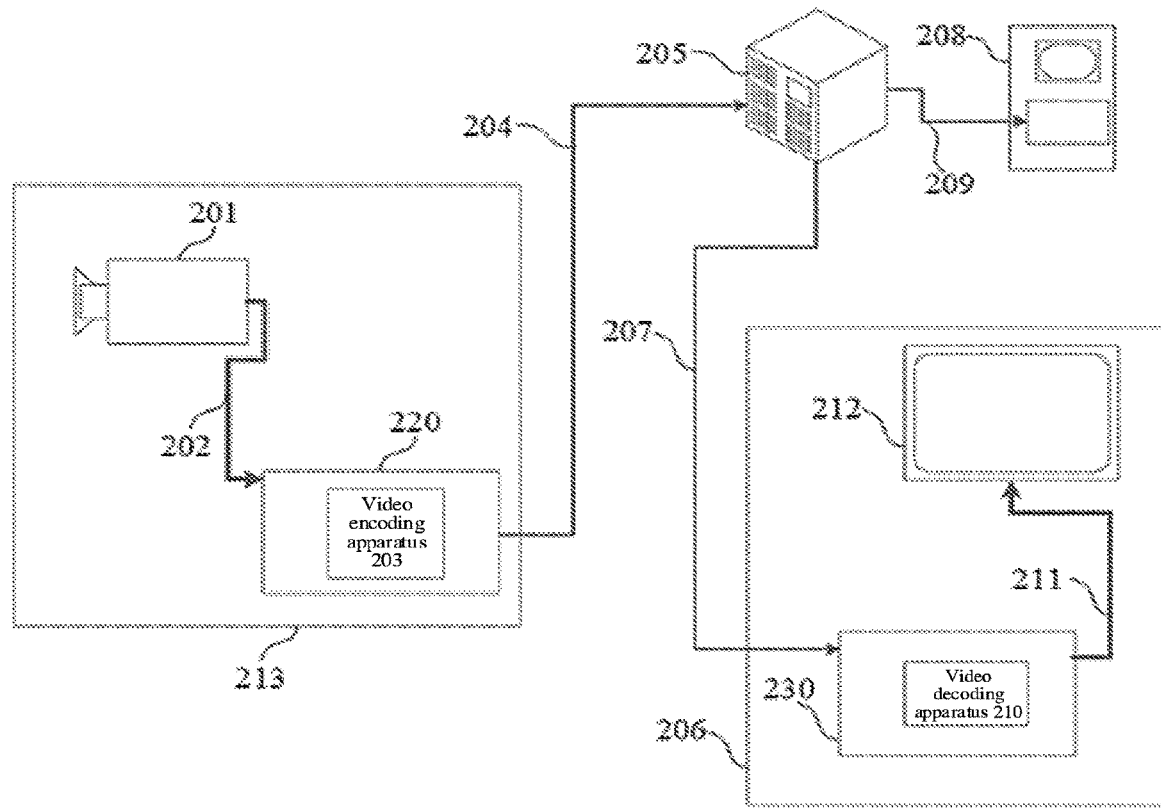
FIG. 2 is a schematic diagram of an architectural view of a video coding apparatus and a video decoding apparatus in a streaming transmission system.

In an embodiment of this disclosure, FIG. 2 shows a placement manner or system/architectural view of a video encoding apparatus and a video decoding apparatus in a streaming transmission environment. The subject disclosed in this disclosure may be comparably applicable to other video-enabled applications, including, for example, a video conference, a digital television (TV), and storage of compressed videos on digital media including a CD, a DVD, and a memory stick.

The streaming system may include an obtaining subsystem 213, which may include a video source 201, such as a digital camera, that creates an uncompressed video picture stream 202. In an embodiment, the video picture stream 202 includes a sample captured by the digital camera. Compared with the coded video data 204 (or a coded video bit stream 204), the video picture stream 202 is depicted by thick lines to emphasize the video picture stream with a large data volume. The video picture stream 202 may be processed by an electronic device 220. The electronic device 220 includes a video encoding apparatus 203 coupled to the video source 201. The video encoding apparatus 203 may include hardware, software, or a combination of hardware and software to realize or implement various aspects of the disclosed subject matter described in more detail below. Compared to the video picture stream 202, the encoded video data 204 (or the encoded video bitstream 204) is depicted as thin lines to emphasize a lower amount of data of the encoded video data 204 (or the encoded video bitstream 204), which may be stored on the streaming server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or an other presence apparatus. In some streaming transmission systems, the coded video data 204, the video data 207, and the video data 209 (for example, the video bit stream) may be coded according to some video coding/compression standards. Embodiments of the standards include ITU-T H.265. In an embodiment, a video coding standard under development is informally referred to as versatile video coding (VVC). This disclosure may be used in the context of the VVC standard.

The electronic device 220 and the electronic device 230 may include other components not shown in the figure. For example, the electronic device 220 may include a video decoding apparatus, and the electronic device 230 may further include a video encoding apparatus.

In an embodiment of this disclosure, international video coding standards such as High Efficiency Video Coding (HEVC) and the VVC and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more basic coding units (CU). The CU is the most basic element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. An encoder side is required to select a predictive coding mode for a current CU and inform a decoder side. The intra prediction means that a predicted signal comes from a region that has been coded and reconstructed in a same image. The inter prediction means that the predicted signal comes from a coded image (referred to as a reference image) that is different from a current image.

Transform & quantization: Transform operations such as Discrete Fourier Transform (DFT) and Discrete Cosine Transform (DCT) are performed on a residual video signal to convert the signal into a transform domain, which is referred to as a conversion coefficient. A lossy quantization operation is further performed on the transform coefficient, which loses a specific amount of information, so that the quantized signal facilitates compressed expression. In some video coding standards, more than one transform mode may be selected. Therefore, the encoder side is also required to select one transform mode for the current CU and inform the decoder side. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which generally brings less distortion and a higher bit rate.

Entropy coding or statistical coding: Statistical compression coding is performed on the quantized signal in the transform domain according to a frequency of occurrence of each value, and finally a binarized (0 or 1) compressed bit stream is outputted. In addition, entropy coding is also performed on other information generated during the coding, such as the selected coding mode and motion vector data, to reduce a bit rate. Statistical coding is a lossless coding manner that can effectively reduce a bit rate required for expressing a same signal. A common statistical coding mode includes variable length coding (VLC for short) or context adaptive binary arithmetic coding (CABAC for short).

Loop filtering may be performed. For example, operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the foregoing filtering operation is also referred to as loop filtering, that is, a filtering operation in a coding loop.

Figure 3:
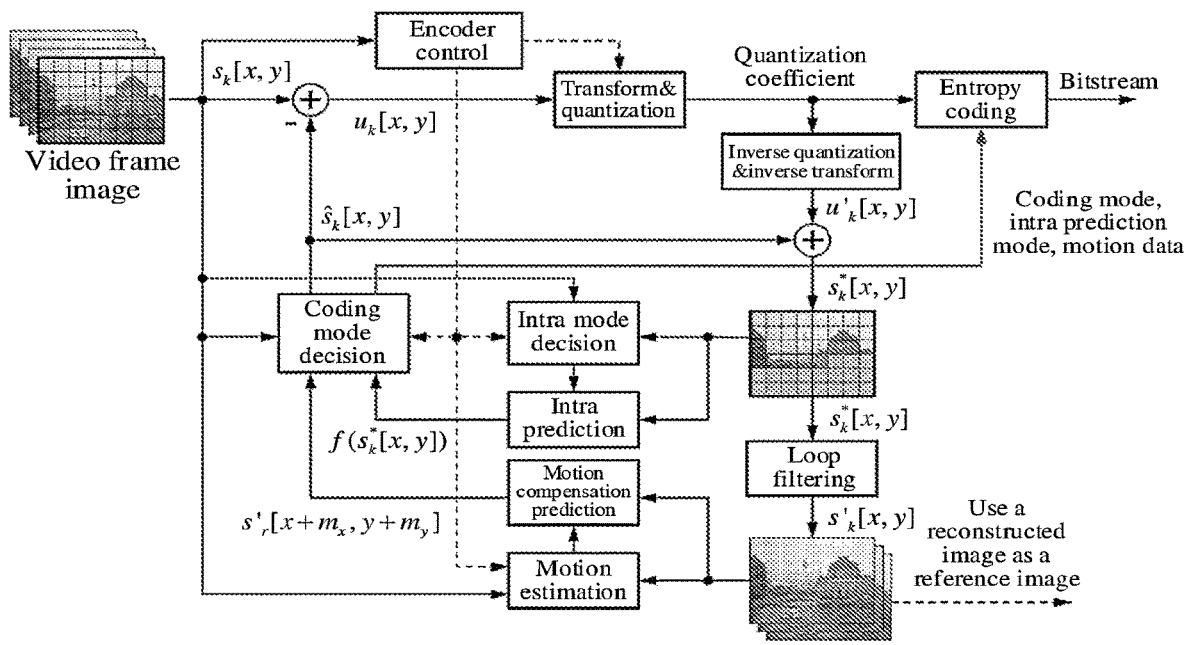
FIG. 3 is an example flowchart of a video encoding process.

In an embodiment of this disclosure, FIG. 3 is a basic flowchart of a video encoding process. In this process, intra prediction is used as an example for description. A difference between an original image signal $s_k[x,y]$ and a predicted image signal $\hat{s}_k[x,y]$ is calculated to obtain a residual signal $u_k[x,y]$, and the residual signal $u_k[x,y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u'_k[x,y]$. The predicted image signal $\hat{s}_k[x,y]$ is superimposed with the reconstructed residual signal $u'_k[x,y]$ to generate an image signal $s^*_k[x,y]$. The image signal $s^*_k[x,y]$ is inputted to an intra mode decision module and an intra prediction module for intra prediction, and is further subjected to loop filtering to output a reconstructed image signal $s'_k[x,y]$. The reconstructed image signal $s'_k[x,y]$ may be used as a reference image for a next frame for motion estimation and motion compensation prediction. Then a predicted image signal $\hat{s}_k[x,y]$ of the next frame is obtained based on a result $s'_r[x+m_x,y+m_y]$ of the motion compensation prediction and a result $f(s^*_k[x,y])$ of the intra prediction. The above process is repeated until the coding is completed.

Based on the foregoing coding process, on the decoder side, for each CU, after a compressed bit stream is acquired, entropy decoding is performed to obtain various mode information and quantization coefficients. Then inverse quantization and inverse transform are performed on the quantization coefficients to obtain a residual signal. Moreover, a predicted signal corresponding to the CU can be obtained according to coding mode information that is known. Then the residual signal may be added to the predicted signal to obtain a reconstructed signal. The reconstructed signal is then subjected to operations such as loop filtering to generate a final output signal.

During decoding an image, a frame of image is usually divided into image blocks (LCUs, or largest coding units) of equal size for reconstruction, and the LCUs are sequentially decoded in the order of raster scanning from left to right and from top to bottom (each row of LCUs, from left to right). Each LCU is divided into a plurality of sub-blocks by a quad-tree (QT), a binary-tree (BT), and an extended quad-tree (EQT), and a processing order is from left to right and from top to bottom.

There are 3 manners of the intra encoding mode of AVS3: conventional intra prediction, intra block copying (IBC), and intra string copying (ISC). For the conventional intra prediction, as shown in FIG. 4, there are 66 intra prediction modes in total, among which mode 3-mode 32, and mode 34-mode 65 are angular prediction modes, mode 33 is a pulse code modulation (PCM) mode, mode 0 is a DC prediction mode, mode 1 is a plane prediction mode, and mode 2 is a bilinear prediction mode.

Figure 4:
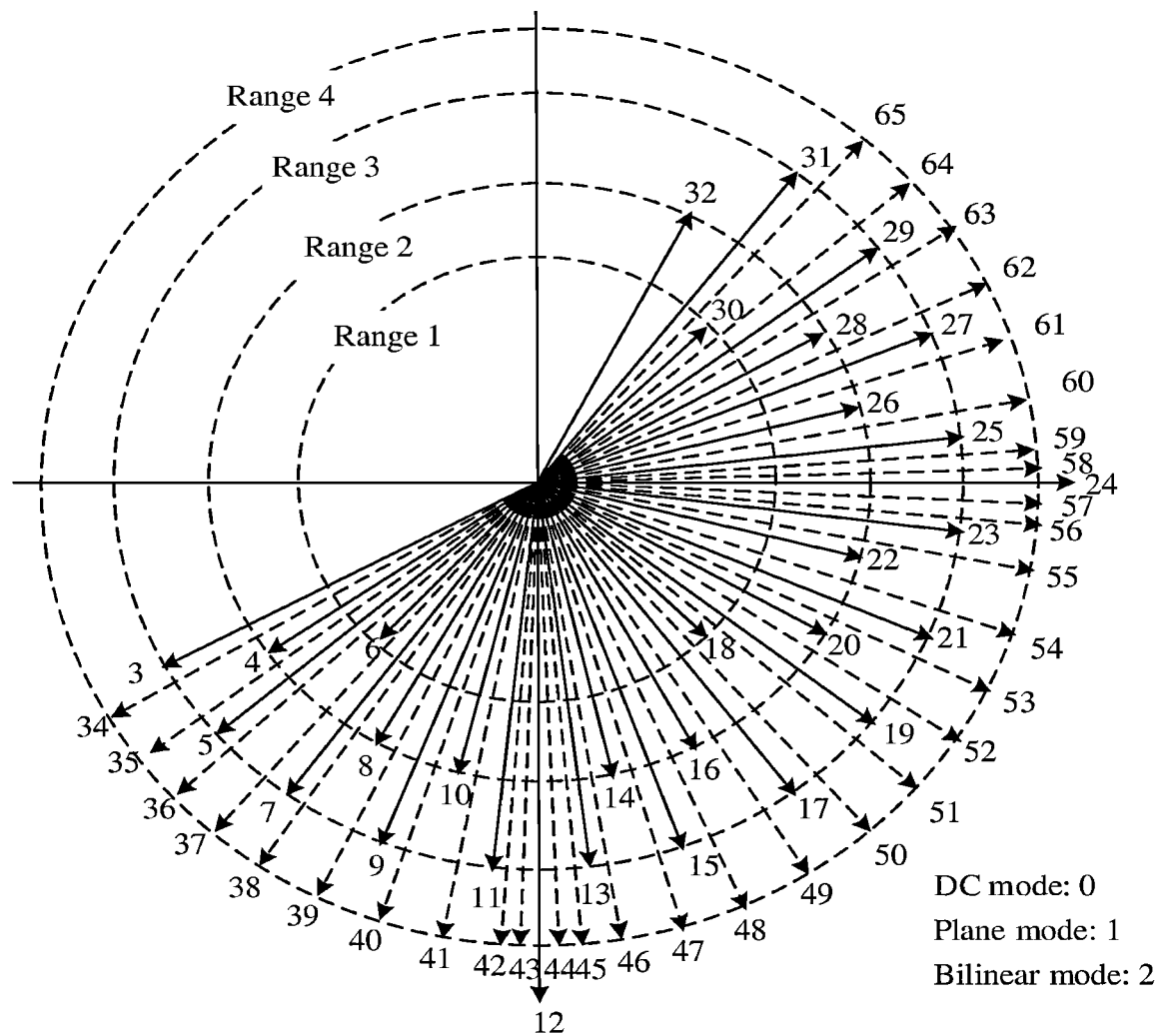
FIG. 4 is a schematic diagram of a prediction direction in an intra prediction mode.

The dashed arrows in FIG. 4 represent the newly introduced extended intra prediction mode (EIPM) in a second stage of AVS3, and mode 12 and mode 24 respectively represent a vertical prediction mode and a horizontal prediction mode. Assuming that the total number of intra prediction modes is IPD_CNT, then if EIPM is turned off, IPD_CNT is 34 (excluding the angular prediction modes of mode 34-mode 65); and if EIPM is turned on, the IPD_CNT is 66.

The use of FIMC technology requires the establishment of a buffer with a length of IPD_CNT, and intra prediction modes corresponding to a coded block in a decoded region are counted, so as to specify two intra prediction modes with highest frequencies as MPMs corresponding to the coded block currently to be decoded. As shown in Table 1 below, there are 2 MPMs in a current MPM list of AVS3. If a prefix included in a parsed coded block is 1, it indicates that an intra prediction mode of the current coded block is in the MPM list, and then a 1-bit suffix in the coded block is parsed to specifically distinguish the MPM modes. If the prefix in the parsed coded block is 0, it indicates that the intra prediction mode of the current coded block is not in the MPM list, and then a 5-bit or a 6-bit fixed-length code needs to be parsed to distinguish the intra prediction mode of the current coded block.

TABLE 1

| Prefix | Suffix |
|---|---|
| 1 | 0 |
|   | 1 |
| 0 | 5-bit fixed-length code (EIPM off) |
|   | 6-bit fixed-length code (EIPM on) |

However, on-chip storage is extremely expensive, and FIMC requires the use of a buffer with a length of IPD_CNT for counting all possible intra prediction modes, and the hardware implementation cost is relatively high. Based on this, in the technical solutions of the embodiments of this disclosure, a process of canceling the statistics of unnecessary intra prediction modes is provided, and only some intra prediction modes are counted to update an MPM list, which can reduce the hardware implementation cost and improve the encoding and decoding performance.

Implementation details of the technical solutions of the embodiments of this disclosure are described below in detail.

Figure 5:
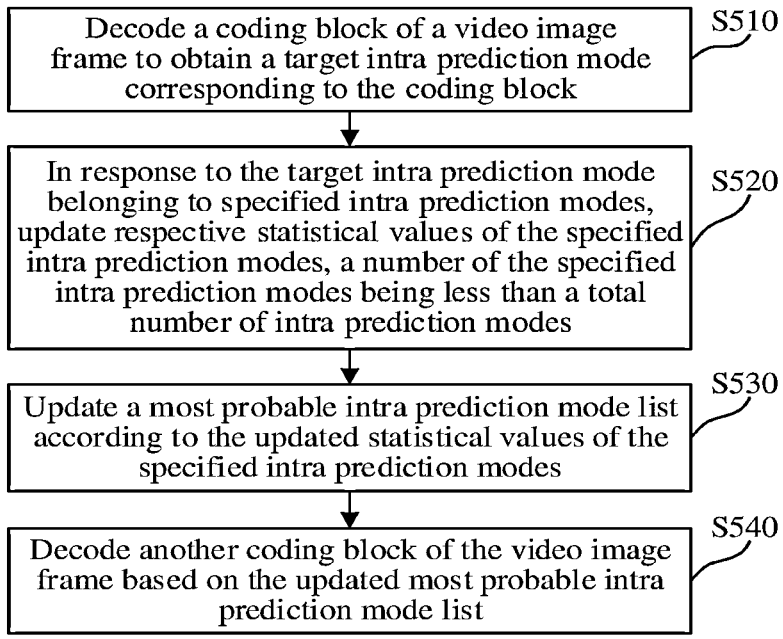
FIG. 5 is a flowchart of a video decoding method according to an example embodiment of this disclosure.

FIG. 5 is a flowchart of a video decoding method according to an embodiment of this disclosure. The video decoding method may be performed by an electronic device having a computing processing function, for example, may be performed by a terminal device or a server. Referring to FIG. 5, the video decoding method includes at least step S510 to step S540. The detailed description is as follows.

Step S510. Decode a coded block of a video image frame to obtain a target intra prediction mode corresponding to the coded block.

In an embodiment of this disclosure, a video image frame sequence includes a series of images. Each image may be further partitioned into slices, and the slices may be further partitioned into a series of LCUs (or CTUs), each LCU including a plurality of CUs. The video image frame is coded by block during coding. In some new video coding standards, for example, in the H.264 standard, a macroblock (MB) is provided. The MB may be further partitioned into a plurality of prediction blocks that may be used for predictive coding. In the HEVC standard, basic concepts such as a CU, a prediction unit (PU), and a transform unit (TU) are used, various block units are partitioned by function, and a new tree-based structure is used for description. For example, a CU may be partitioned into smaller CUs according to a quadtree, and the smaller CUs may be further partitioned to form a quadtree structure. The coded block in this embodiment of this disclosure may be a CU, or a block smaller than the CU, such as a smaller block obtained by partitioning the CU.

In an embodiment of this disclosure, the target intra prediction mode corresponding to the coded block is the intra prediction mode adopted by the coded block. Optionally, the target intra prediction mode corresponding to the coded block may be determined by parsing the prefix and suffix included in the coded block. Specifically, if the MPM list includes 2 intra prediction modes, similar to that shown in Table 1 above, if a prefix included in a parsed coded block is 1, it indicates that an intra prediction mode of the current coded block is in the MPM list, and then a 1-bit suffix in the coded block is parsed to specifically distinguish the MPM modes; and if the prefix in the parsed coded block is 0, it indicates that the intra prediction mode of the current coded block is not in the MPM list, and then a 5-bit or a 6-bit fixed-length code needs to be further parsed to distinguish the intra prediction mode of the current coded block.

Step S520: In response to the target intra prediction mode belonging to specified intra prediction modes, update respective statistical values of the specified intra prediction modes, a number of the specified intra prediction modes being less than a total number of intra prediction modes.

In an embodiment of this disclosure, the total number of intra prediction modes represents a total number of intra prediction modes specified in a standard. For example, in AVS3 standard, the total number of intra prediction modes is 66 (in a case that EIPM is turned on).

In an embodiment of this disclosure, the specified intra prediction modes may include at least two intra prediction modes among a horizontal prediction mode, a vertical prediction mode, a bilinear prediction mode, a DC prediction mode, a quasi-horizontal prediction mode, and a quasi-vertical prediction mode; and the specified intra prediction modes may be preset based on the video type.

The quasi-horizontal prediction mode refers to a prediction mode adjacent to the horizontal prediction mode, and the quasi-vertical prediction mode refers to a prediction mode adjacent to the vertical prediction mode. Optionally, an offset value between the quasi-horizontal prediction mode and the horizontal prediction mode is less than a first threshold, and an offset value between the quasi-vertical prediction mode and the vertical prediction mode is less than a second threshold.

For example, in AVS3 standard, an offset value between the quasi-horizontal prediction mode and the horizontal prediction mode is less than 10°, and an offset value between the quasi-vertical prediction mode and the vertical prediction mode is less than 10°. This embodiment of this disclosure does not limit the specific values of the first threshold and the second threshold.

In some embodiments, in AVS3 standard, the quasi-horizontal prediction mode includes mode 56 to mode 59 (EIPM on), mode 23, and mode 25 in intra prediction modes; and the quasi-vertical prediction mode includes mode 42 to mode 45 (EIPM on), mode 11, and mode 13 in intra prediction modes.

In an embodiment of this disclosure, the specified intra prediction modes may include at least two intra prediction modes of mode 0 to mode 33 in intra prediction modes. In some other example implementations, the specified intra prediction modes may be mode 0 to mode 33, that is, statistical values of mode 0 to mode 33 need to be calculated during statistics, without the need to perform statistics on modes 34 to 65.

In some example implementations, the specified intra prediction modes include at least a horizontal prediction mode and a vertical prediction mode.

In an embodiment of this disclosure, the specified intra prediction modes may include: a horizontal prediction mode and a vertical prediction mode. That is, in the technical solution of this embodiment, only statistical values of the horizontal prediction mode and the vertical prediction mode may be calculated.

In an embodiment of this disclosure, the specified intra prediction modes may include: a horizontal prediction mode, a vertical prediction mode, and a bilinear prediction mode. That is, in the technical solution of this embodiment, only statistical values of the horizontal prediction mode, the vertical prediction mode, and the bilinear prediction mode may be calculated.

In an embodiment of this disclosure, the specified intra prediction modes may include: a horizontal prediction mode, a vertical prediction mode, a bilinear prediction mode, and a DC prediction mode. That is, in the technical solution of this embodiment, only statistical values of the horizontal prediction mode, the vertical prediction mode, the bilinear prediction mode, and the DC prediction mode may be calculated.

In an embodiment of this disclosure, initial statistical values of prediction modes corresponding to the specified intra prediction modes may be the same, for example, the initial statistical values are set to 0.

In an embodiment of this disclosure, initial statistical values of prediction modes corresponding to the specified intra prediction modes may be different. That respective initial statistical values of prediction modes are different means that the initial statistical values of the prediction modes are completely different, or the initial statistical values of the prediction modes are partially same and partially different. For example, the specified intra prediction modes may include three intra prediction modes, and the initial statistical values of the three intra prediction modes may be 0, 1, and 2, or the initial statistical values of the three intra prediction modes are 0, 0, and 1, or the like.

In an embodiment of this disclosure, the updating respective statistical values of the specified intra prediction modes may be increasing a statistical value of a target specified intra prediction mode corresponding to the target intra prediction mode by a set step size, intra prediction modes among the specified intra prediction modes corresponding to a same set step size, for example, increasing by 1 each time.

In another embodiment of this disclosure, the set step sizes corresponding to the intra prediction modes among the specified intra prediction modes are different. For example, the specified intra prediction modes include two intra prediction modes, and the set step sizes corresponding to the first and second intra prediction modes may be respectively 1 and 2.

In an embodiment of this disclosure, whether simplified frequency-based intra mode coding needs to be used for a corresponding coded block may be determined according to at least one of following manners:

a value of an index identifier included in a sequence header corresponding to a video image frame sequence; and a value of an index identifier included in an image header corresponding to the video image frame.

In response to determining that the simplified frequency-based intra mode coding needs to be used, whether the target intra prediction mode belongs to the specified intra prediction modes is determined.

The simplified frequency-based intra mode coding may be abbreviated as SFIMC, which is specifically a solution in which only the statistical values of the specified intra prediction modes are calculated as described in the foregoing embodiments of this disclosure.

Based on the foregoing solutions, in particular, in determining whether the SFIMC needs to be used, the following manners may be used:

1. An indication manner using an index identifier in a sequence header corresponding to a video image frame sequence. If a value of the index identifier in the sequence header is a first value, for example, the first value is 1 (the value is only an example), it indicates that all coded blocks corresponding to the video image frame sequence need to adopt the SFIMC.

2. An indication manner using an index identifier in an image header corresponding to the video image frame. If a value of the index identifier in the image header is a second value, for example, the second value is 1 (the value is only an example), it indicates that all coded blocks corresponding to the video image frame need to adopt the SFIMC.

3. An indication manner using both an index identifier in a sequence header corresponding to a video image frame sequence and an index identifier in an image header corresponding to the video image frame. If the value of the index identifier in the sequence header is the first value (such as 1), and the value of the index identifier in the image header is the second value (such as 1), then it indicates that all coded blocks corresponding to the image header need to adopt the SFIMC.

If the value of the index identifier in the sequence header is the first value, and the value of the index identifier in the image header is not the second value, it indicates that coded blocks corresponding to the video image frame do not adopt the SFIMC.

If the value of the index identifier in the sequence header is not the first value, it indicates that coded blocks corresponding to video image frames in the video image frame sequence do not adopt the SFIMC. In an embodiment of this disclosure, if the value of the index identifier included in the sequence header corresponding to the video image frame sequence indicates that the coded blocks corresponding to the video image frame sequence need to adopt the SFIMC, then mode 34 to mode 65 of the intra prediction modes may not be used. That is, it is determined that the coded blocks corresponding to the video image frame sequence adopt one intra prediction mode from mode 0 to mode 33 of the intra prediction modes. In the technical solutions of this embodiment, in a case of indicating that corresponding coded blocks need to adopt an SFIMC using a sequence header, it also indicates that the coded blocks do not use mode 34 to mode 65 of intra prediction modes, which can also avoid counting all 66 intra prediction modes, thereby increasing the hardware cost.

In an embodiment of this disclosure, if the value of the index identifier included in the image header of the coded blocks corresponding to the video image frame sequence indicates that the coded blocks corresponding to the video image frames need to adopt the SFIMC, then mode 34 to mode 65 of the intra prediction modes may not be used. That is, it is determined that the coded blocks corresponding to the video image frames adopt one intra prediction mode from mode 0 to mode 33 of the intra prediction modes. In the technical solutions of this embodiment, when it is indicated that corresponding coded blocks need to adopt an SFIMC using an image header, it also indicates that the coded blocks do not use mode 34 to mode 65 of intra prediction modes, which can also avoid counting all 66 intra prediction modes, thereby decreasing the hardware cost.

Still referring to FIG. 5, Step S530: Update a most probable intra prediction mode list according to the updated statistical values of the specified intra prediction modes.

In an embodiment of this disclosure, an initial intra prediction mode in the most probable intra prediction mode list belongs to the specified intra prediction modes, for example, 1, 2, 3, or more intra prediction modes may be selected from the specified intra prediction modes as the initial intra prediction mode in the most probable intra prediction mode list. That is, the intra prediction mode in the MPM list is selected from the foregoing specified intra prediction modes during initialization.

In an embodiment of this disclosure, in a case that the most probable intra prediction mode list includes 2 intra prediction modes during initialization, the 2 intra prediction modes may be respectively a horizontal prediction mode and a vertical prediction mode; or may be respectively a horizontal prediction mode and a bilinear prediction mode; or may be respectively a vertical prediction mode and a bilinear prediction mode.

In an embodiment of this disclosure, the process of updating a most probable intra prediction mode list according to the updated statistical values of the specified intra prediction modes includes specifically selecting, in descending order of the statistical values based on a number of intra prediction modes included in the most probable intra prediction mode list, intra prediction modes matching the number from the specified intra prediction modes to replace the intra prediction modes included in the most probable intra prediction mode list. The number of intra prediction modes selected from the specified intra prediction modes is the same as the number of intra prediction modes included in the MPM list.

For example, assuming that the MPM list includes 2 intra prediction modes, namely modeT [0] and modeT [1], a first largest statistical value (cost0) and a second largest statistical value (cost1) respectively correspond to modeT[0] and modeT[1], that a current intra prediction mode is currMode, and that a corresponding statistical value is currCost, then the MPM list is updated by selecting first 2 intra prediction modes with statistical values in descending order.

Still referring to FIG. 5, step S540: Decode another coded block of the video image frame based on the updated most probable intra prediction mode list.

In an embodiment of this disclosure, the decoding another coded block of the video image frame based on the updated MPM list may specifically be determining the target intra prediction mode corresponding to the coded block by parsing the prefix and suffix included in the coded block, based on the updated MPM list. Specifically, if the MPM list includes 2 intra prediction modes, similar to that shown in Table 1 above, if a prefix included in a parsed coded block is 1, it indicates that an intra prediction mode of the current coded block is in the MPM list, and then a 1-bit suffix in the coded block is parsed to specifically distinguish the MPM mode; and if the prefix in the parsed coded block is 0, it indicates that the intra prediction mode of the current coded block is not in the MPM list, and then a 5-bit or a 6-bit fixed-length code needs to be parsed to distinguish the intra prediction mode of the current coded block.

After determining the target intra prediction mode corresponding to the coded block of the video image frame, if the target intra prediction mode belongs to the specified intra prediction modes, the encoder side updates the respective statistical values of the specified intra prediction modes, the number of the specified intra prediction modes also being less than the total number of intra prediction modes, and then updates the most probable intra prediction mode list according to the updated statistical values of the specified intra prediction modes, and finally encodes another coded block of the video image frame based on the updated most probable intra prediction mode list.

Optionally, the encoder side may select an optimal intra prediction mode corresponding to the coded block of the video image frame based on rate distortion optimization (RDO), and then use the optimal intra prediction mode as the target intra prediction mode corresponding to the coded block. In addition, the process of the encoder side updating the statistical values of the specified intra prediction modes and the MPM list is similar to that of the decoder side, and details are not described again.

In the technical solution of the foregoing embodiments of this disclosure, only some intra prediction modes need to be counted to update an MPM list, which can reduce the hardware implementation cost and improve the encoding and decoding performance.

The following describes apparatus embodiments of this disclosure, and the apparatus embodiments may be used for performing the video encoding and decoding methods in the foregoing embodiments of this disclosure. For details not disclosed in the apparatus embodiments of this disclosure, reference is made to the embodiments of the foregoing video decoding method of this disclosure.

Figure 6:
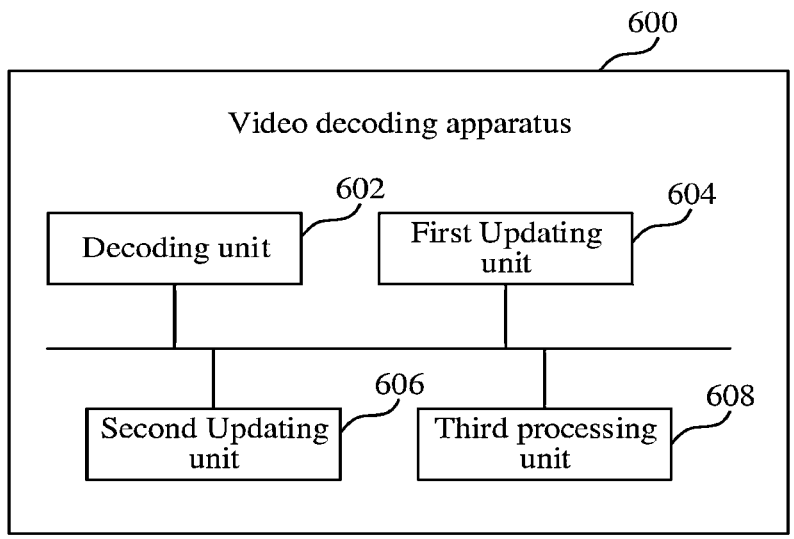
FIG. 6 is a block diagram of a video decoding apparatus according to an example embodiment of this disclosure.

FIG. 6 is a block diagram of a video decoding apparatus according to an embodiment of this disclosure. The video decoding apparatus may be arranged in a device with a computing processing function, for example, may be arranged in a terminal device or a server.

Referring to FIG. 6, a video decoding apparatus 600 according to an embodiment of this disclosure includes a decoding unit 602, a first updating unit 604, a second updating unit 606, and a processing unit 608.

The decoding unit 602 is configured to decode a coded block of a video image frame to obtain a target intra prediction mode corresponding to the coded block. The first updating unit 604 is configured to, in response to the target intra prediction mode belonging to specified intra prediction modes, update respective statistical values of the specified intra prediction modes, a number of the specified intra prediction modes being less than a total number of intra prediction modes. The second updating unit 606 is configured to update a most probable intra prediction mode list according to the updated statistical values of the specified intra prediction modes. The processing unit 608 is configured to decode another coded block of the video image frame based on the updated most probable intra prediction mode list.

In some embodiments of this disclosure, based on the foregoing solutions, the specified intra prediction modes include at least two intra prediction modes among a horizontal prediction mode, a vertical prediction mode, a bilinear prediction mode, a DC prediction mode, a quasi-horizontal prediction mode, and a quasi-vertical prediction mode, an offset value between the quasi-horizontal prediction mode and the horizontal prediction mode being less than a first threshold, and an offset value between the quasi-vertical prediction mode and the vertical prediction mode being less than a second threshold.

In some embodiments of this disclosure, in AVS3 standard, the quasi-horizontal prediction mode includes mode 56 to mode 59, mode 23, and mode 25 in intra prediction modes; and the quasi-vertical prediction mode includes mode 42 to mode 45, mode 11, and mode 13 in intra prediction modes.

In some embodiments of this disclosure, based on the foregoing solutions, the specified intra prediction modes include:
 a horizontal prediction mode and a vertical prediction mode; or
 a horizontal prediction mode, a vertical prediction mode, and a bilinear prediction mode; or
 a horizontal prediction mode, a vertical prediction mode, a bilinear prediction mode, and a DC prediction mode.

In some embodiments of this disclosure, based on the foregoing solutions, the specified intra prediction modes include: at least two intra prediction modes of mode 0 to mode 33 in intra prediction modes.

In some embodiments of this disclosure, based on the foregoing solutions, respective initial statistical values of prediction modes among the specified intra prediction modes are same; or
 respective initial statistical values of prediction modes among the specified intra prediction modes are different.

In some embodiments of this disclosure, based on the foregoing solutions, an initial intra prediction mode in the most probable intra prediction mode list belongs to the specified intra prediction modes.

In some embodiments of this disclosure, based on the foregoing solutions, in a case that the most probable intra prediction mode list includes 2 initial intra prediction modes, the 2 initial intra prediction modes include:
 a horizontal prediction mode and a vertical prediction mode; or
 a horizontal prediction mode and a bilinear prediction mode; or
 a vertical prediction mode and a bilinear prediction mode.

In some embodiments of this disclosure, based on the foregoing solutions, the first updating unit 604 is configured to: increase a statistical value of a target specified intra prediction mode corresponding to the target intra prediction mode by a set step size, intra prediction modes among the specified intra prediction modes corresponding to a same or different set step sizes.

In some embodiments of this disclosure, based on the foregoing solutions, the second updating unit 606 is configured to: select, in descending order of the statistical values based on a number of intra prediction modes included in the most probable intra prediction mode list, intra prediction modes matching the number from the specified intra prediction modes to replace the intra prediction modes included in the most probable intra prediction mode list.

In some embodiments of this disclosure, based on the foregoing solutions, the video decoding apparatus 600 further includes: a processing unit, configured to determine whether simplified frequency-based intra mode coding needs to be used for a corresponding coded block according to at least one of following manners, and in response to determining that the simplified frequency-based intra mode coding needs to be used, determine whether the target intra prediction mode belongs to the specified intra prediction modes:
 a value of an index identifier included in a sequence header corresponding to a video image frame sequence; and
 a value of an index identifier included in an image header corresponding to the video image frame.

In some embodiments of this disclosure, based on the foregoing solutions, in response to the value of the index identifier included in the sequence header corresponding to the video image frame sequence being a first value, the simplified frequency-based intra mode coding is used for each coded block in the video image frame sequence; or
 in response to the value of the index identifier included in the image header corresponding to the video image frame being a second value, the simplified frequency-based intra mode coding is used for each coded block in the video image frame.

In this disclosure above, a unit or a module may be hardware such as a combination of electronic circuitries, firmware, or software such as computer instructions. The unit and the module may also be any combination of hardware, firmware, and software. In some implementation, a unit may include at least one module.

Figure 7:
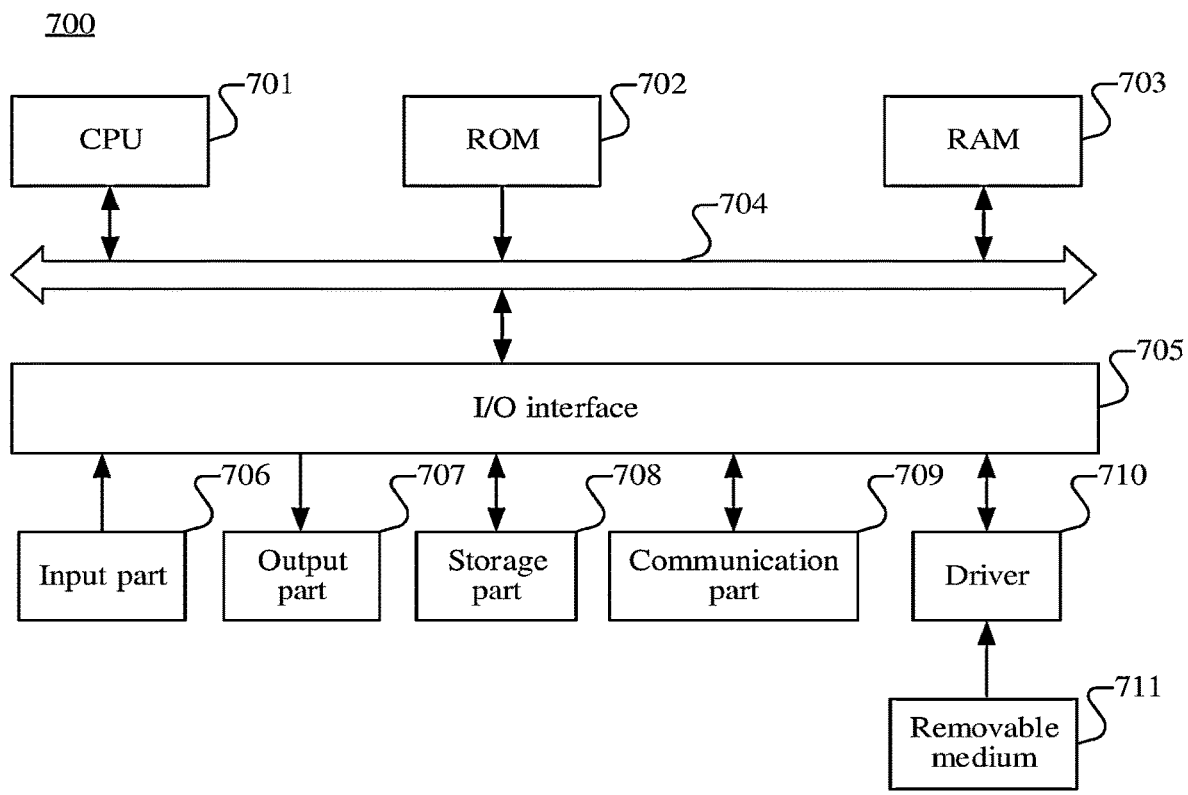
FIG. 7 is a schematic structural diagram of a computer system adapted to implement an electronic device according to an example embodiment of this disclosure.

FIG. 7 is a schematic structural diagram of a computer system adapted to implement an electronic device according to an embodiment of this disclosure.

A computer system 700 of the electronic device shown in FIG. 7 is merely an example, and does not constitute any limitation on functions and use ranges of the embodiments of this disclosure.

As shown in FIG. 7, the computer system 700 includes a central processing unit (CPU) 701, which may perform various suitable actions and processing based on a program stored in a read-only memory (ROM) 702 or a program loaded from a storage part 708 into a random access memory (RAM) 703, for example, perform the method described in the foregoing embodiments. The RAM 703 further stores various programs and data required for system operations. The CPU 701, the ROM 702, and the RAM 703 are connected to each other through a bus 704. An input/output (I/O) interface 705 is also connected to the bus 704.

The following components are connected to the I/O interface 705: an input part 706 including a keyboard and a mouse, etc.; an output part 707 including a cathode ray tube (CRT), a liquid crystal display (LCD), a speaker, or the like; a storage part 708 including hard disk, etc.; and a communication part 709 including a network interface card such as a local area network (LAN) card, a modem, or the like. The communication part 709 performs communication processing by using a network such as the Internet. A driver 710 is also connected to the I/O interface 705 as required. A removable medium 711, such as a disk, an optical disc, a magneto-optical disc, or a semiconductor memory, is installed on the drive 710 as required, so that a computer program read from the removable medium is installed in the storage part 708 as required.

Particularly, according to an embodiment of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 709, and/or installed from the removable medium 711. When the computer program is executed by the CPU 701, the various functions defined in the system of this disclosure are executed.

The computer-readable medium shown in the embodiments of this disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium including or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wired medium or the like, or any suitable combination thereof.

Related units described in the embodiments of this disclosure may be implemented in a software manner, or may be implemented in a hardware manner, and the unit described can also be set in a processor. Names of the units do not constitute a limitation on the units in a specific case.

In another aspect, this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

It is to be understood that this disclosure is not limited to the precise structures described above and shown in the accompanying drawings, and various modifications and changes may be made without departing from the scope of this disclosure. The scope of this disclosure is subject only to the appended claims.

What is claimed is:

1. A method for video decoding, applicable to a decoding device, the method comprising:
    decoding a coded block of a video image frame to determine a target intra prediction mode corresponding to the coded block;
    tracking a predefined subset of intra prediction modes among available intra prediction modes rather than all of the available intra prediction modes, a number of the predefined subset of intra prediction modes being less than a total number of the available intra prediction modes;
    maintaining a most probable intra prediction mode list;
    determining whether simplified frequency-based intra mode coding needs to be used for a corresponding coded block according to at least one of a value of an index identifier comprised in a sequence header corresponding to a video image frame sequence, or a value of an index identifier comprised in an image header corresponding to the video image frame;
    in response to determining that the simplified frequency-based intra mode coding needs to be used, determining whether the target intra prediction mode belongs to the predefined subset of intra prediction modes;
    in response to the target intra prediction mode belonging to the predefined subset of intra prediction modes, updating statistical values of the predefined subset of intra prediction modes;
    updating the most probable intra prediction mode list according to the updated statistical values of the predefined subset of intra prediction modes; and
    decoding another coded block of the video image frame based on the updated most probable intra prediction mode list.

2. The method for video decoding according to claim 1, wherein the predefined subset of intra prediction modes comprise at least two intra prediction modes among a horizontal prediction mode, a vertical prediction mode, a bilinear prediction mode, a DC prediction mode, a quasi-horizontal prediction mode, and a quasi-vertical prediction mode, an angle offset value between the quasi-horizontal prediction mode and the horizontal prediction mode being less than a first threshold, and an angle offset value between the quasi-vertical prediction mode and the vertical prediction mode being less than a second threshold.

3. The method for video decoding according to claim 2, wherein the predefined subset of intra prediction modes comprise at least a quasi-horizontal prediction mode and a quasi-vertical prediction mode, the quasi-horizontal prediction mode comprising one of mode 56 to mode 59, mode 23, and mode 25 in predefined AV3 intra prediction modes; and the quasi-vertical prediction mode comprising one of mode 42 to mode 45, mode 11, and mode 13 in the predefined AV3 intra prediction modes.

4. The method for video decoding according to claim 1, wherein the predefined subset of intra prediction modes comprise:
    a horizontal prediction mode and a vertical prediction mode; or
    a horizontal prediction mode, a vertical prediction mode, and a bilinear prediction mode; or
    a horizontal prediction mode, a vertical prediction mode, a bilinear prediction mode, and a DC prediction mode.

5. The method for video decoding according to claim 1, wherein the predefined subset of intra prediction modes comprise: at least two intra prediction modes of mode 0 to mode 33 in predefined AV3 intra prediction modes.

6. The method for video decoding according to claim 1, wherein an initial intra prediction mode in the most probable intra prediction mode list belongs to the predefined subset of intra prediction modes.

7. The method for video decoding according to claim 1, wherein the most probable intra prediction mode list comprises two initial intra prediction modes, and the two initial intra prediction modes comprise:
  a horizontal prediction mode and a vertical prediction mode; or
  a horizontal prediction mode and a bilinear prediction mode; or
  a vertical prediction mode and a bilinear prediction mode.

8. The method for video decoding according to claim 1, wherein updating the statistical values of the predefined subset of intra prediction modes comprises:
  increasing a statistical value of a target specified intra prediction mode corresponding to the target intra prediction mode by a set step size.

9. The method for video decoding according to claim 1, wherein updating the most probable intra prediction mode list according to the updated statistical values of the predefined subset of intra prediction modes comprises:
  selecting, in descending order of the statistical values based on a number of intra prediction modes comprised in the most probable intra prediction mode list, intra prediction modes matching the number from the predefined subset of intra prediction modes to replace the intra prediction modes comprised in the most probable intra prediction mode list.

10. The method for video decoding according to claim 1, wherein
  in response to the value of the index identifier comprised in the sequence header corresponding to the video image frame sequence being a first value, the simplified frequency-based intra mode coding is used for each coded block in the video image frame sequence; or
  in response to the value of the index identifier comprised in the image header corresponding to the video image frame being a second value, the simplified frequency-based intra mode coding is used for each coded block in the video image frame.

11. A method for video encoding, applicable to an encoding device, the method comprising:
  determining a target intra prediction mode corresponding to a coding block of a video image frame;
  tracking a predefined subset of intra prediction modes among available intra prediction modes rather than all of the available intra prediction modes, a number of the predefined subset of intra prediction modes being less than a total number of the available intra prediction modes;
  maintaining a most probable intra prediction mode list;
  determining whether simplified frequency-based intra mode coding needs to be used for a corresponding coded block according to at least one of a value of an index identifier comprised in a sequence header corresponding to a video image frame sequence, or a value of an index identifier comprised in an image header corresponding to the video image frame;
  in response to determining that the simplified frequency-based intra mode coding needs to be used, determining whether the target intra prediction mode belongs to the predefined subset of intra prediction modes;
  in response to the target intra prediction mode belonging to a predefined subset of intra prediction modes, updating respective statistical values of the predefined subset of intra prediction modes;
  updating the most probable intra prediction mode list according to the updated statistical values of the predefined subset of intra prediction modes; and
  encoding another coding block of the video image frame based on the updated most probable intra prediction mode list.

12. An electronic device, comprising a memory for storing computer instructions and a processor configured to executed the computer instructions to:
  decode a coded block of a video image frame to obtain a target intra prediction mode corresponding to the coded block;
  track a predefined subset of intra prediction modes among available intra prediction modes rather than all of the available intra prediction modes, a number of the predefined subset of intra prediction modes being less than a total number of the available intra prediction modes;
  maintain a most probable intra prediction mode list;
  determining whether simplified frequency-based intra mode coding needs to be used for a corresponding coded block according to at least one of a value of an index identifier comprised in a sequence header corresponding to a video image frame sequence, or a value of an index identifier comprised in an image header corresponding to the video image frame;
  in response to determining that the simplified frequency-based intra mode coding needs to be used, determining whether the target intra prediction mode belongs to the predefined subset of intra prediction modes;
  in response to the target intra prediction mode belonging to a predefined subset of intra prediction modes, update statistical values of the predefined subset of intra prediction modes;
  update the most probable intra prediction mode list according to the updated statistical values of the predefined subset of intra prediction modes; and
  decode another coded block of the video image frame based on the updated most probable intra prediction mode list.

13. The electronic device according to claim 12, wherein the predefined subset of intra prediction modes comprise at least two intra prediction modes among a horizontal prediction mode, a vertical prediction mode, a bilinear prediction mode, a DC prediction mode, a quasi-horizontal prediction mode, and a quasi-vertical prediction mode, an angle offset value between the quasi-horizontal prediction mode and the horizontal prediction mode being less than a first threshold, and an angle offset value between the quasi-vertical prediction mode and the vertical prediction mode being less than a second threshold.

14. The electronic device according to claim 12, wherein the predefined subset of intra prediction modes comprise:
  a horizontal prediction mode and a vertical prediction mode; or
  a horizontal prediction mode, a vertical prediction mode, and a bilinear prediction mode; or
  a horizontal prediction mode, a vertical prediction mode, a bilinear prediction mode, and a DC prediction mode.

15. The electronic device according to claim 12, wherein
initial statistical values of prediction modes among the
predefined subset of intra prediction modes are same;
or
initial statistical values of prediction modes among the
predefined subset of intra prediction modes are different.

16. The electronic device according to claim 12, wherein updating the statistical values of the predefined subset of intra prediction modes comprises:
increasing a statistical value of a target specified intra prediction mode corresponding to the target intra prediction mode by a set step size, wherein intra prediction modes among the predefined subset of intra prediction modes correspond to a same or different set step sizes.

17. The electronic device according to claim 12, wherein updating the most probable intra prediction mode list according to the updated statistical values of the predefined subset of intra prediction modes comprises:
selecting, in descending order of the statistical values based on a number of intra prediction modes comprised in the most probable intra prediction mode list, intra prediction modes matching the number from the predefined subset of intra prediction modes to replace the intra prediction modes comprised in the most probable intra prediction mode list.

* * * * *